(12) United States Patent
Chandler, Jr.

(10) Patent No.: US 6,443,005 B1
(45) Date of Patent: Sep. 3, 2002

(54) PRESSURE ACTIVATED CONTROL

(75) Inventor: William D. Chandler, Jr., Ashland, OH (US)

(73) Assignee: Chandler Systems, Inc., Ashland, OH (US)

( * ) Notice: Subject to any disclaimer, the term of this patent is extended or adjusted under 35 U.S.C. 154(b) by 50 days.

(21) Appl. No.: 09/590,415

(22) Filed: Jun. 8, 2000

(51) Int. Cl.[7] .................... G01F 23/00; G01F 23/36; H01H 9/00; H01H 35/24; H01H 35/18

(52) U.S. Cl. .................. 73/301; 73/313; 200/1 R; 200/81.4; 200/83 J

(58) Field of Search .................... 73/299, 301, 303, 73/753, 313, 314, 319, 201; 361/160; 200/1 R, 81 R, 81.4, 83 R, 83 J, 83.4, 83.5, 83.5 A, 84 R, 84 B; 340/618, 624

(56) References Cited

U.S. PATENT DOCUMENTS

| | | | | |
|---|---|---|---|---|
| 3,283,092 A | * | 11/1966 | Grostick | 200/61.2 |
| 3,773,991 A | * | 11/1973 | Krieger et al. | 200/83 P |
| 4,480,469 A | * | 11/1984 | Tice | 73/308 |
| 4,972,705 A | * | 11/1990 | Fryer et al. | 73/155 |
| 6,164,325 A | * | 12/2000 | Fraun | 137/557 |

FOREIGN PATENT DOCUMENTS

GB     2237377-13    *  5/1991    ........... 200/83 J

* cited by examiner

Primary Examiner—Hezron Williams
Assistant Examiner—Katina Wilson
(74) Attorney, Agent, or Firm—Ralph E. Jocke; Daniel D. Wasil; Walker & Jocke

(57) ABSTRACT

An improved pressure activated control apparatus is provided for sensing fluid pressure and triggering one or more switches in response to the fluid pressure, as desired. The apparatus includes a first resilient member, such as a pliable rolling diaphragm or bellofram, having an outer surface exposed to the fluid and responsive to the fluid pressure. A force translation and switching mechanism responds to the force exerted by the pressure of the fluid on the outer surface area of the first resilient member to trigger one or more switches mounted on an adjustable switch track assembly within the apparatus housing. The pressure activated control apparatus includes a second resilient member, such as a spring with a chosen spring constant, k, that provides a biasing force against the force translation and switching mechanism. In an embodiment, a plurality of microswitches are each adjustably and removably connected on the switch track assembly. Each switch can be positioned and triggered at a different position with each switch position representing a different fluid pressure and corresponding level. The range of fluid level being sensed or controlled can be changed by changing the spring to provide a different biasing force, or by adjusting the position of the microswitches mounted on the switch track assembly. In another embodiment, the apparatus is provided in a system for controlling fluid level within a vessel.

24 Claims, 8 Drawing Sheets

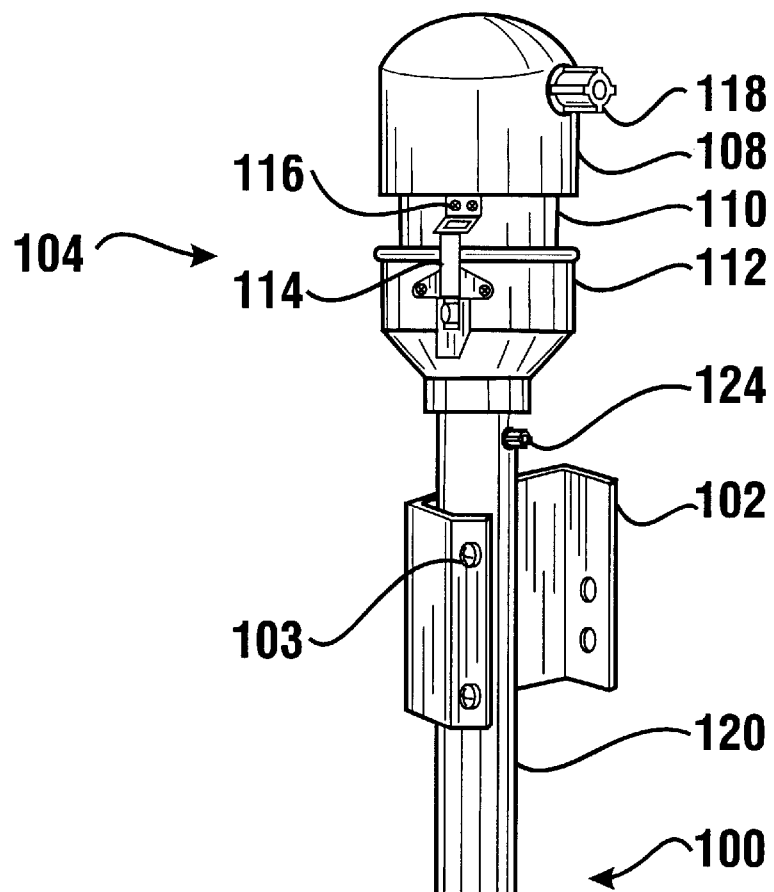
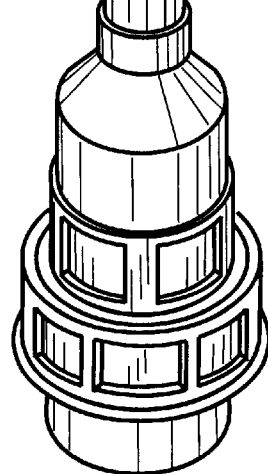

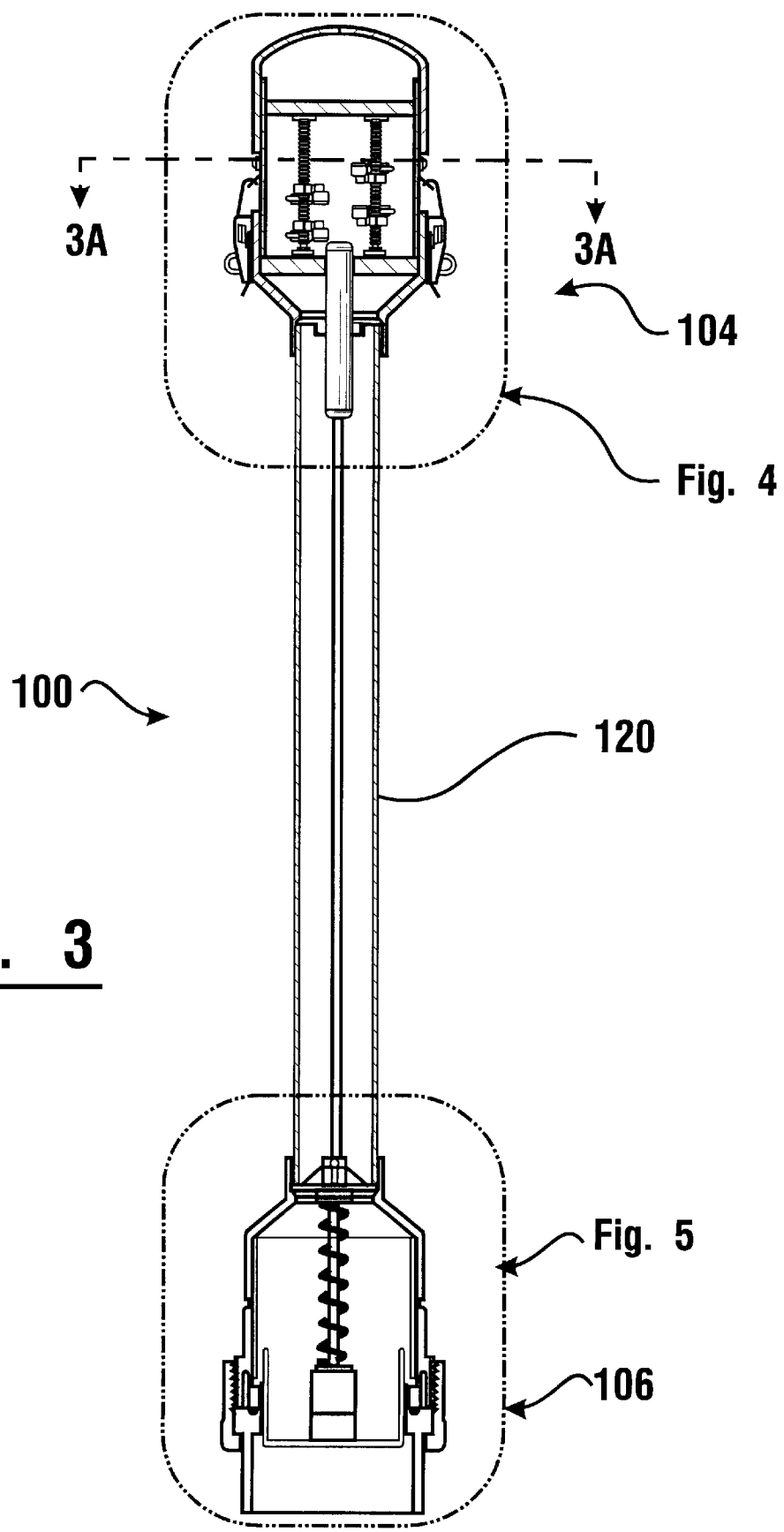

PRESSURE ACTIVATED CONTROL

FIELD OF THE INVENTION

The present invention relates to pressure-responsive systems and components and, more particularly, to apparatuses that sense fluid level or pressure and respond thereto by triggering a switching mechanism.

BACKGROUND OF THE INVENTION

It is often desirable to know information about fluid level in tanks. Determining fluid level and controlling fluid level in tanks, such as in sewage tanks, water cisterns or tanks, and other fluid system and storage vessels, whether enclosed or open and exposed to the environment, has been done in a number of ways. Where applicable and accessible, visual readings can be taken. In some systems, though, visual readings are not desirable, since a response to the level indication is typically desired, such as to pump more fluid into the vessel or to discharge fluid from the vessel. In other situations, visual readings are not available due to lack of access. In addition, control systems are typically employed to respond to a fluid level indication, such as to operate a pump or a valved member in a gravity inflow or discharge arrangement, or to illuminate a light on an indicator panel representing the fluid level, e.g. Having a human operator make a visual fluid level reading and manually initiate this desired function may not be desirable due to the repetitive nature of the function or due to the inefficiency of having a human operator in the system.

These control or indicator functions are typically handled by electronic control systems which are responsive to one or more switches that are triggered by fluid level or pressure input. In sewage tanks, for example, it is well known to use multiple tilt style float switches to control fluid level. These may be mercury switches or rolling ball style switches, where a ball triggers a microswitch within the mechanism, that are triggered when the whole switch mechanism tilts downward toward a tethered connection a sufficient amount. These tilt style float switches are each attached via an anchor tether either directly to the vessel interior wall, or to a bar, rail, or other vertically disposed structural member within the vessel, such that a plurality of these tilt style float switches are disposed vertically with each one representing a unique elevation of fluid level within the vessel. They operate on a one-to-one ratio, that is, at the point they are triggered they are meant to represent that specific fluid level within the vessel. Numerous problems, however, have been encountered with these mechanisms.

Turbulent conditions within a fluid-holding vessel can negatively impact performance of float switch systems. Within a sewage tank, e.g., turbulence can result from fluidized material inflow, but more typically from pump-discharged fluid material exiting the tank. This turbulence can create undesirable eddies and waves within the tank that can cause tethered tilt style float switches to become entangled, thus preventing them and the system from proper operation. In addition, the turbulence within the tank can cause inadvertent switching (i.e., a switch to trigger prematurely or later than desired) and what is often referred to as "contact chatter" of the switches within the tilt style float switch assemblies. Inadvertent switching can cause system inefficiency and degradation, such as from a false level reading or from a pump to turn on or off earlier or later than desired. Such contact chatter can cause the pump, which is responsive to the triggered switch, to cycle inadvertently on and off at a high rate, resulting in undue and undesirable system wear and operation.

Other problems that can result from tilt style float switches are due to the fact that they are disposed on the surface of the fluid material in the sewage tank, a highly corrosive and greasy environment. These tethered switches can become damaged from banging against each other and the tank wall during the turbulent system operation. In addition, the greasy outer surface of the tilt style float switches can cause them to intermittently adhere and even get stuck against the tank wall, thus affecting system performance and reliability. In addition, low pressure sewage system tanks in both residential and commercial use are often of corrugated side wall construction. These corrugations can serve as a series of mini ledges or shelves to the grease-covered tilt style float switches, thus facilitating their adherence and entrapment.

The tilt style float switches can also become corroded. Leaking mercury from some styles of these switches poses a serious environmental and health hazard. Non-mercury versions of the tilt style float switches can similarly be ruined by corrosion, such as of the contact or leads, thus rendering them inoperable.

Another type of known switching mechanism performs similarly to the typical ball float that operates the valve in a toilet, which floats with the fluid level and closes the valve when the tank is full after the toilet is flushed. In these switching mechanisms, the ball floats on the liquid and bumps switches on and off, but it can only act on a one-to-one ratio, that is, the ball float represents the actual liquid level when the switch is bumped and triggered, not some multiple thereof.

Electronic pressure transducers have been used to sense fluid pressure. These devices are disposed in the fluid and typically operate by direct pressure against a diaphragm area that changes its resistive value as the component strain changes. They require an electronic box to convert the circuit signals to analog relay outputs for use in controlling pumps, etc. Though reliable, these electronic pressure transducers and required electronics are expensive.

Another common problem with all of the aforementioned tilt style float switch, vertical ball float or electronic pressure transducer systems is in servicing these systems. Since they are disposed in sewage tanks or other fluid vessels, servicing them can be a messy, less than ideal, undertaking.

The present invention provides a new and unique pressure activated control apparatus and system that overcomes the above problems and others.

SUMMARY OF THE INVENTION

An improved pressure activated control apparatus is provided that includes a first resilient member having a first or outer surface exposed to the fluid and responsive to the fluid pressure to trigger one or more switches of a switching mechanism. It has a second or inner surface exposed to the inside of the apparatus that is sealed from the fluid. A force translation and switching mechanism is provided that responds to the force exerted by the pressure of the fluid on the outer surface of the first resilient member to trigger one or more switches within the apparatus. The pressure activated control includes a second resilient member that provides a biasing force against the force translation and switching mechanism in a direction opposite to the force exerted by the fluid pressure on the outer surface of the first resilient member. In this way, change in height of the fluid level within the vessel compared to movement of the force translation and switching mechanism is greater than one-to-one.

The apparatus of the present invention provides a reliable, affordable alternative to known tilt style float switches, vertical float switching assemblies and electronic pressure transducer-based systems used for, among other possibilities, determining fluid level or controlling fluid level in open or enclosed fluid holding vessels, such as fluid storage or septic tanks, cisterns, sump and sewage basins, and other fluid system and storage vessels. In one embodiment, the pressure activated control of the present invention is provided in an elongate, vertically disposed housing that can be connected to an interior side wall of a tank, cistern or other fluid-holding vessel, such that the first resilient member has an outer surface that is substantially always in contact with the fluid. The first resilient member can be a pliable rolling diaphragm made of durable nitrile rubber, or any other suitable material selected based on the environment it is to be exposed to, including chemical and thermal environments, e.g. The rolling diaphragm is in the shape of a bellofram, or a cup with a radially outwardly extending peripheral flange at its upper open end (i.e., it is top hat-shaped), that is sealed at its flange to the housing near a first or lower housing end. The rolling diaphragm acts together with a push cup, a rod and a plunger that are centrally disposed in the elongate housing to serve as a substantially zero friction piston to actuate or trip one or more switches, such as a plurality of microswitches.

In an embodiment, the second resilient member can be a spring of a selected spring constant, "k," that is disposed within the housing between the push cup and an annularly disposed spring plate which is connected to the housing. The spring can be annularly disposed around the rod and provides a biasing force against the push cup and rolling diaphragm, such that for every lineal distance of movement of the piston assembly, which includes the rolling diaphragm, push cup, rod and plunger, vertically upward within the housing, a multiple greater than one times that lineal distance of incremental fluid level is being represented by that piston assembly movement. Simply changing the spring to one with a different spring constant k, allows for a different fluid level range to be sensed or controlled with the same pressure control apparatus. For example, one spring can give approximately eighteen inches of fluid level representation or control with about four inches of corresponding piston assembly travel, whereas a second spring can give forty-two inches of fluid level representation or control. Obviously, substituting a different spring (different k constant) will give a correspondingly different range of fluid level control.

In an embodiment, a plurality of microswitches are housed in a head portion of the housing, at a second or upper housing end, and are each adjustably and removably connected on an inventive switch track assembly such that each one is tripped at a different plunger vertical elevation within the housing, thereby allowing for adjustable fluid level control within the vessel. In one embodiment, the switch track assembly comprises a top piece and a bottom piece connected by four identical spaced switch mounting rails, or switch track rods. The microswitches are each connected to a switch coupler piece that snaps onto an adjacent pair of the rods, such that the switch trigger can be contacted by the plunger coming through a hole in the bottom piece of the switch track assembly in response to sensed fluid pressure on the overall piston assembly. Each switch coupler and corresponding microswitch pair can easily be snapped along the switch track rails making for an adjustable fluid level control system. In an embodiment, the switch track assembly can accommodate up to fourteen such commercially available microswitches each mounted on a removable switch coupler to two adjacent switch track rods.

Although one surface of the rolling diaphragm is meant to be continuously exposed to fluid material in the tank at a subsurface fluid level, the remaining interior of the housing is sealed from the fluid and can be connected to a source of fresh air, such as by a vent tube or line connected at some upper apparatus location to outside air external to the fluid vessel. In this way, the switches are not exposed to corrosive liquids or gases within the vessel and the volume of air displaced by the rolling diaphragm and piston assembly in response to a fluid elevation increase in the vessel can be vented. Correspondingly, the vent line serves as a source of fresh air brought into the apparatus when the fluid elevation within the vessel is decreased, such as by a pump discharge cycle, and the rolling diaphragm unrolls or relaxes with the piston assembly moving downward.

The housing may be made substantially from a combination of commercially available, off-the-shelf, standard sized PVC piping, couplers, reducers, aluminum bar stock, and the like, and from a minimum number of specially fabricated components (such as of molded ABS, Lexan® (General Electric Company) or other suitable plastic, or fabricated from another suitable material), thereby minimizing system cost. In an embodiment, four microswitches can be provided representing, from lowest to highest elevation along a switch track assembly: off, pump on one, pump on two, and an alarm, respectively. Such is a common set up in sewage tank systems, thereby making for easy retrofit of tilt style float switch sewage tank systems with the present invention. The inventive apparatus can simply replace the tilt style float switches and be wired to the existing control system. Servicing the system and adjusting the switches and corresponding fluid control levels can be done simply and in the field, without any tools. In another possible system embodiment for sensing fluid level and indicating the same, fourteen microswitches can be provided. Such a system could be employed to represent a series of fluid elevations on an indicator panel and have an alarm level, e.g. Of course, longer piston assemblies and switch track assemblies could be substituted allowing for more microswitches and more range of fluid level representation and control.

The pressure activated control apparatus and system of the present invention provide a reliable, affordable and easily serviceable means to trigger a switching apparatus in response to fluid pressure or level. No electric cords or components are submerged in the fluid. The fluid level can be adjustably controlled by the apparatus. The apparatus operates within its own enclosure envelope and senses fluid pressure at a subsurface fluid level, such that it is not susceptible to turbulent surface conditions or the greasy surface layer typically found in sewage tanks that is known to affect system performance and reliability.

Still further advantages of the present invention will become apparent to those of ordinary skill in the art upon reading and understanding the following detailed description of the preferred embodiments.

BRIEF DESCRIPTION OF THE DRAWINGS

FIG. 2 is a perspective view of an embodiment of the present invention.

FIG. 3 is a partial sectional side view of an embodiment of the present invention.

DETAILED DESCRIPTION

Figure 1:
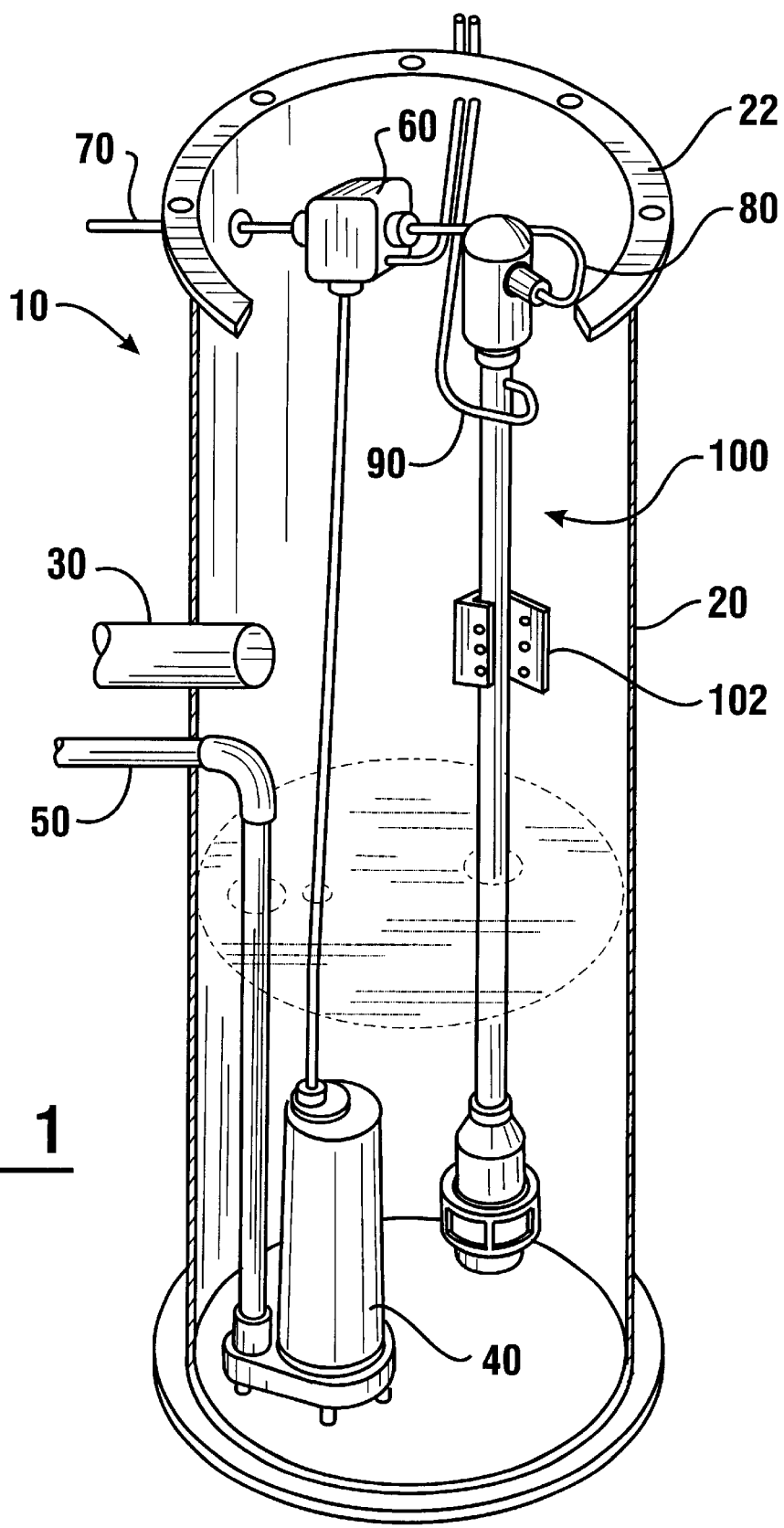
FIG. 1 is a partial sectional view of an embodiment of the present invention for sensing and controlling fluid level within a system, in perspective.

Referring now to the figures, which are for purposes of illustrating the present invention and not for limiting same, FIG. 1 depicts a liquid level control system 10 in accordance with an embodiment and the principles of the present invention. Included are a fluid-holding vessel 20, a fluid inlet line 30 for bringing fluidized material into vessel 20, a fluid pump 40 for discharging fluid material from vessel 20 via a discharge line 50, a typical junction box 60 having a power cord 70 for connecting with a power source (not shown), a switch cord 80, which can be any suitable length for connecting the pressure activated control apparatus, shown generally at 100, with the junction box 60, and a vent line 90 for venting air from within the pressure activated control 100 and as a source of fresh outside air thereto. The flange 22 radially extending outwardly from around the top of vessel 20 can be connected with a vessel lid (not shown) to make an enclosed fluid vessel. In addition, a bracket 102 can connect the pressure activated control apparatus 100 to the interior wall of vessel 20 where desired, such as by screws, rivets, bonding or some other means of attachment, such that the pressure activated control 100 is maintained substantially in a vertical orientation. Similarly, screws (such as 103 in FIG. 2), or thumb screws (not shown) can be used to clamp, or otherwise connect, pressure activated control apparatus 100 to bracket 102.

Furthermore, the vessel 20 represents any type of open or enclosed fluid-holding vessel for use in the system 10 wherein fluid level is indicated or controlled, such as within a desired range of fluid levels. System 10, therefore, may represent a septic tank, a liquid storage tank, a cistern for water or other liquid or solution, a lift station, a sewage basin, or any other system wherein fluid level information is important for a system operator to know or where it is to be controlled. In system 10, when fluidized material enters inflow 30 and the level of fluid is raised to a sufficient level, pressure activated control 100 senses the rise in fluid level via a corresponding rise in fluid pressure and a switch is triggered therein (the operation of pressure activated control 100 and details of the switching mechanism will be more fully described infra). The pump 40 is switched on and fluid material is discharged from vessel 20 via discharge line 50. When a sufficient amount of fluid is discharged, pressure activated control senses a corresponding drop in fluid pressure and can trigger another switch, which turns the pump off. Of course, an alternative would be for the pump to turn on for a controlled amount of time at a known pump discharge rate, and then shut off. This would require additional controls (not shown).

Figure 3A:
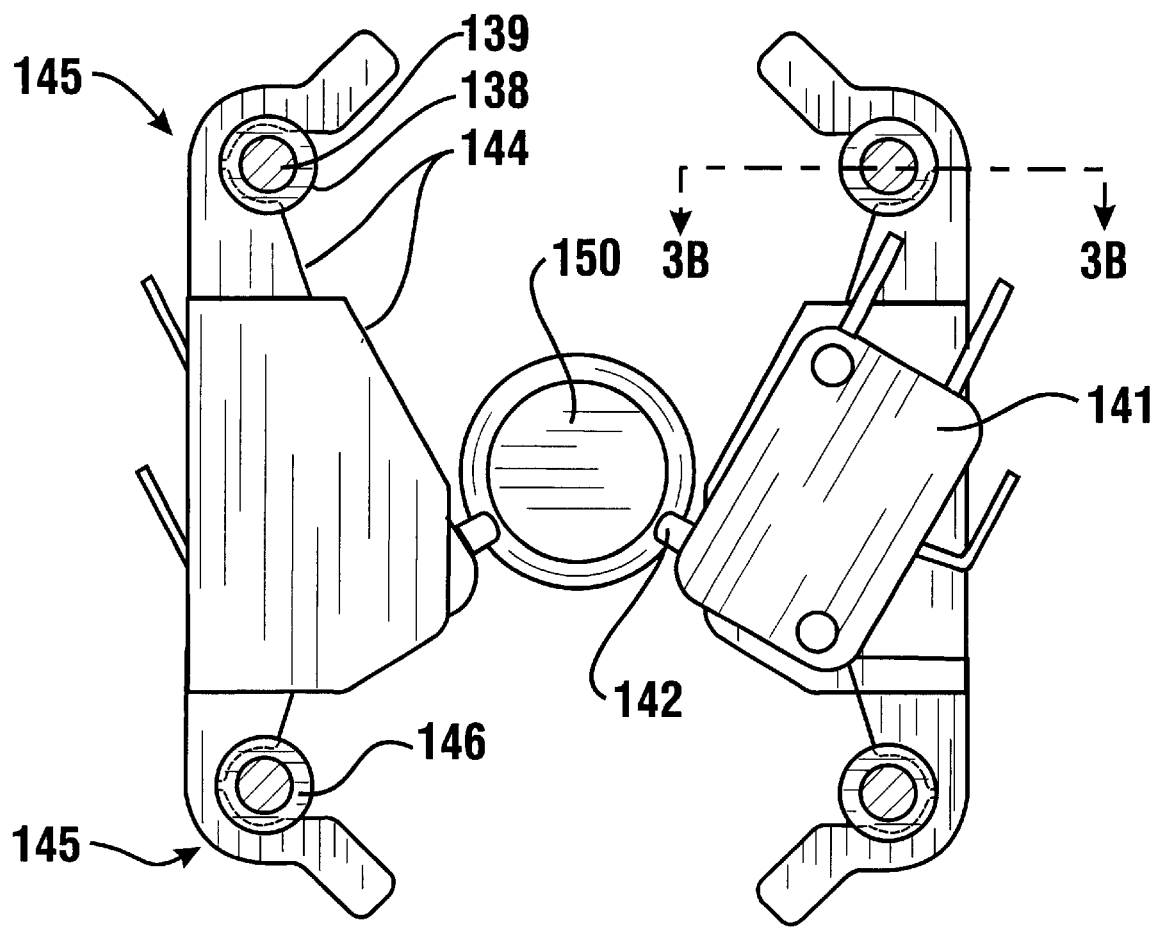
FIG. 3A is an enlarged partial sectional view taken along section line 3A—3A from FIG. 3.
Figure 3B:
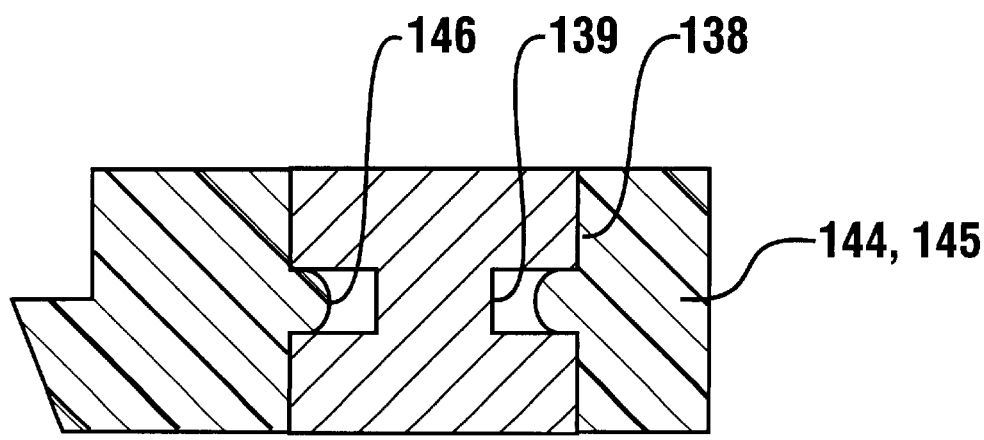
FIG. 3B is an enlarged view taken along section line 3B—3B from FIG. 3A.
Figure 4:
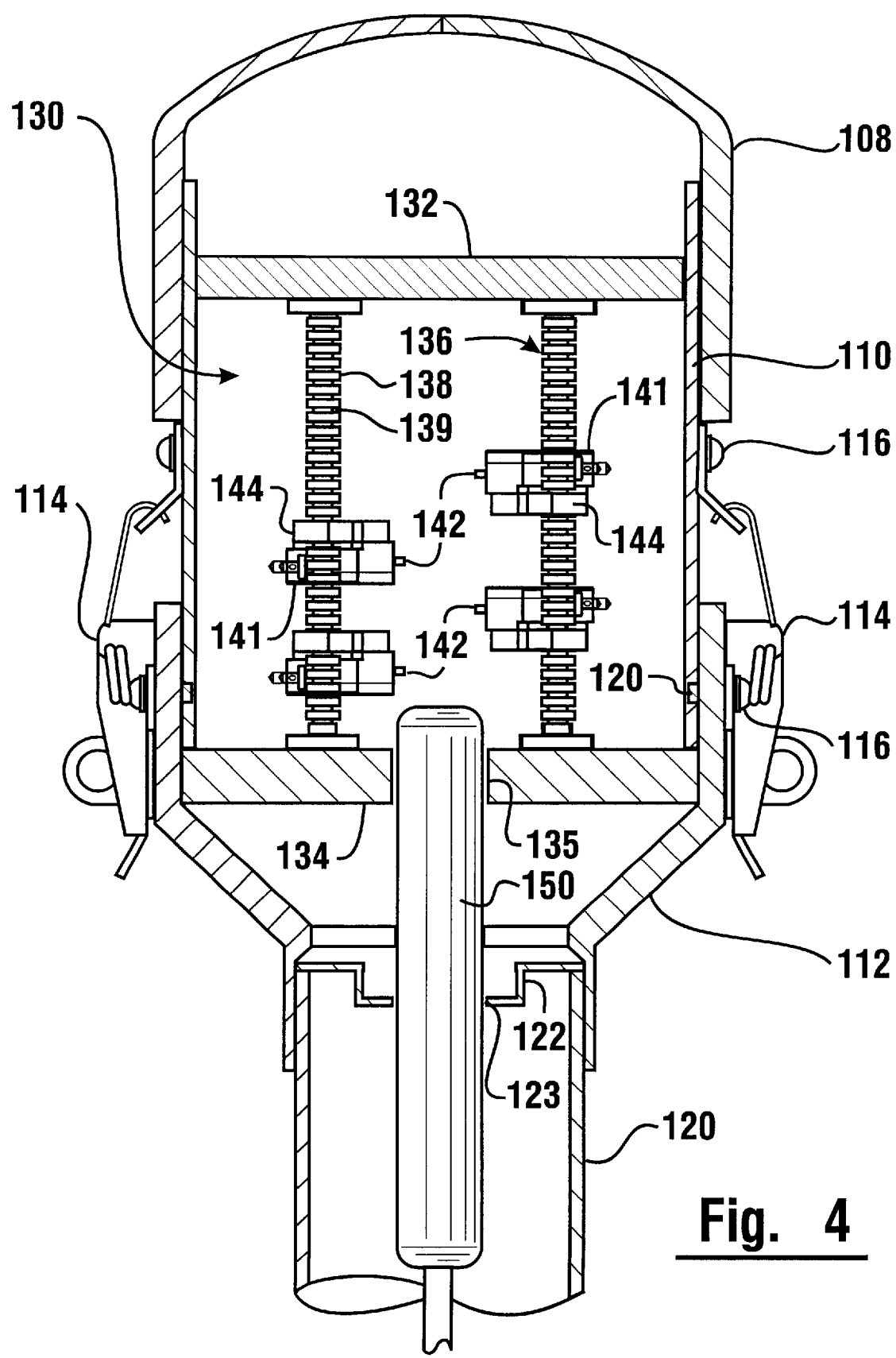
FIG. 4 is an enlarged view of the head assembly of the apparatus as encircled in the FIG. 3 depiction.

Referring now to FIGS. 2–4 for the details of the pressure activated control 100, which is a pressure sensing and switching apparatus. The illustrated embodiment of the apparatus has a head assembly 104 and a lower unit 106.

Head assembly 104 includes a top cap 108, a coupler 110 and a top reducer 112. All three pieces, 108, 110 and 112, can be of affordable PVC construction, which, in certain sizes, are commercially available, or of some other suitable plastic or other material. For example, top reducer 112 may be a standard four inch by two inch PVC reducer, with a four inch coupler 110 made of standard PVC conduit stock, and having available top caps, such as top cap 108 to fit therewith. The top cap 108 and coupler 110 can be connected together, such as by solvent welding, or by some other known method of plastic bonding, such as using ultrasonics, heat, adhesives, a machined threaded connection or even mechanical clamps. Top cap 108 has a switch cord connection 118 (for connection with a corresponding switch cord, such as 80 in FIG. 1). Top coupler 110 fits closely within the top portion of top reducer 112 and is releasably connected therewith such as by a pair of latches 114 (FIG. 4). The pair of mechanical latches 114 can be connected, such as with standard screws 116, to the top coupler 110 and top reducer 112, as illustrated, with each being opposed one hundred eighty degrees around top coupler 110 and top reducer 112 from each other. In addition, an O-ring 120 is provided to fit around, and be carried by, a grove 111 in the cylindrical top coupler 110 to facilitate sealing of top coupler 110 to top reducer 112 when latched (best illustrated in FIGS. 4 and 7).

Figure 6:
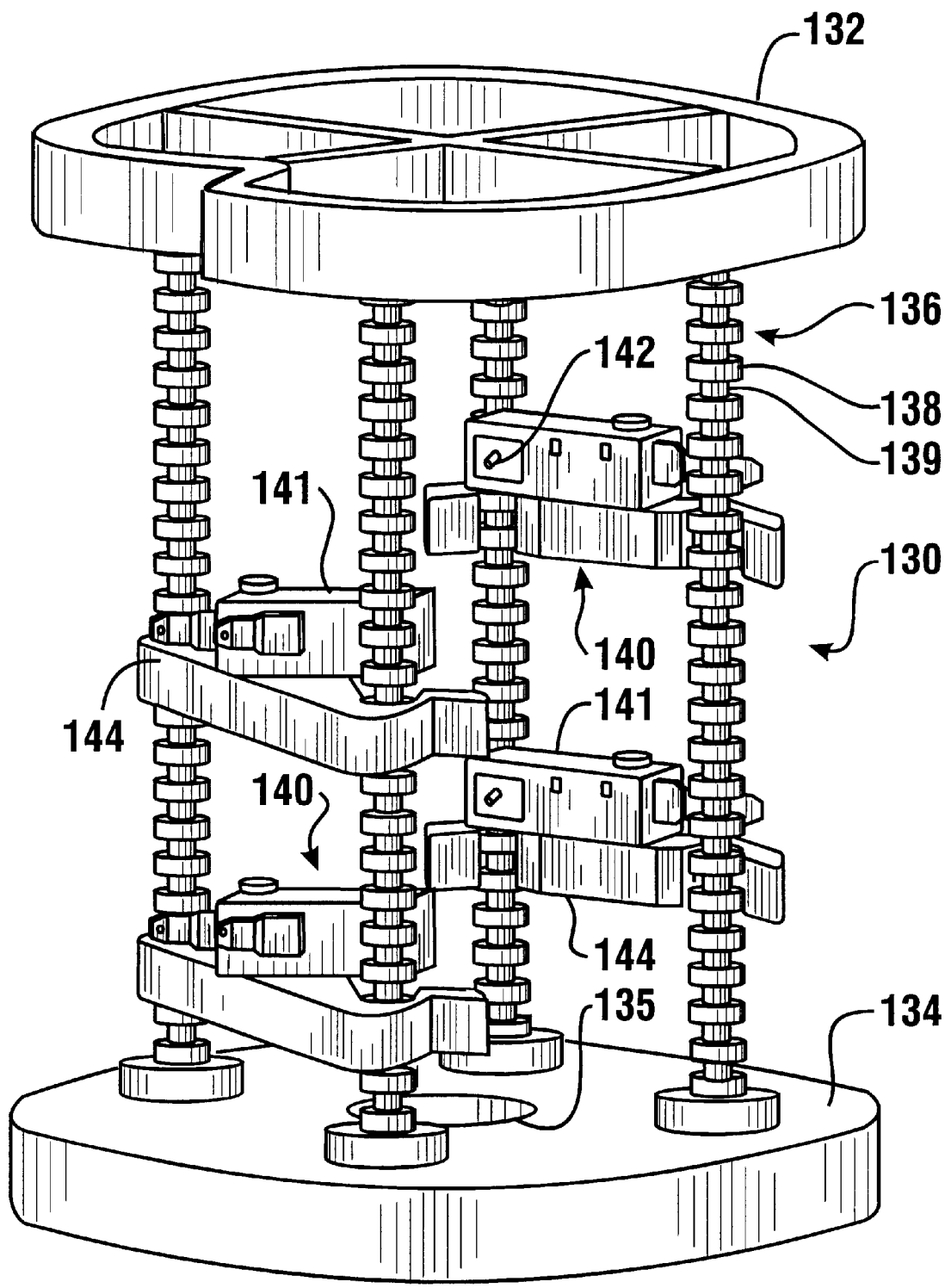
FIG. 6 is an enlarged perspective view of the switch track assembly of the present invention.

Referring now to FIGS. 4 and 6, an inventive switch track assembly 130 is housed inside head assembly 104. Switch track assembly is easily serviceable by an operator without any tools by simply unlatching latches 114, removing top cap and top coupler 108 and 110, respectively, and removing the switch track assembly 130 for servicing. In the illustrated embodiment, switch track assembly 130 includes a top 132, a bottom 134 and four switch track rods 136 for connecting with the top and the bottom, such as by solvent welding, and for releasably carrying one or more microswitch assemblies 140 (FIG. 7) thereto. Bottom 134 is slightly larger in diameter than top 132 such that top coupler 10 retains and centers switch track assembly 130 to top reducer 112 (see FIG. 4), such that bottom 134 can rest just within the conical portion of top reducer 112 where the reduction in diameter begins. In this manner, switch track assembly 130 is automatically centered to top reducer 112 when opposed latches 114 connect top coupler 110 to top reducer 112, thereby sandwiching a portion of bottom 134 therebetween. Bottom 134 includes a central hole 135 for plunger 150 to fit through when it is displaced vertically upward in response to fluid pressure to trigger protruding triggers 142 on microswitches 141 (FIG. 3A).

Referring now to FIGS. 3A, 3B, 4 and 6, a pair of adjacent switch track rods 136 are used to carry each microswitch assembly 140. Each switch track rod 136 is identical and includes a plurality of alternating larger diameter sections 138 and smaller diameter sections 139. Each microswitch assembly 140 can be identical, as well, and includes a microswitch 141 with protruding trigger 142 and a switch coupler 144 connected therewith. Microswitches 141 can be any of a number of highly-reliable, commercially-available microswitches suitable for the desired function. These can be rated for three million or more switching cycles. In a typical sewage tank system, the switch may be activated to turn on a pump, e.g., ten times per day, or so. Switch couplers 144 can be molded of flame-resistant ABS plastic construction, or of another suitable material. Each microswitch 141 is connected, such as by adhesive bonding, to a switch coupler 144. Each switch coupler 144 has a pair of snaps 145 for connecting the switch assembly 140 to a pair of adjacent switch track rods 136. Each snap 145 is designed to fit snugly around a majority portion, such as about two hundred forty degrees, of two adjacent larger diameter sections 138 of a switch track rod 136. In such an embodiment, there would be approximately sixty degrees of squeeze contact of the snap 145 with the switch track rod 136. Each snap 145 can include a centering or positioning ring or bead 146 that fits in the smaller diameter section 139 between the two adjacent larger diameter sections 138 that assists with centering the snap 145 and helps keep it from sliding out of the desired location along the switch track rod 136. The snap 145 uses the memory of the plastic to act like a living hinge.

In an embodiment (such as illustrated in FIGS. 1 and 4), four microswitches 141 can be provided representing, from lowest to highest elevation along a switch track assembly 130: off, pump 40 on one, pump 40 on two (many commercial pumps can have two speeds, or a second pump could be used, which is not shown), and an alarm, respectively. Such is a common set up in sewage tank systems (FIG. 1), thereby making for easy retrofit of tilt style float switch sewage tank systems with the present inventive pressure control apparatus 100. Pressure control apparatus 100 can simply replace the tilt style float switches and be wired to the existing control system. Servicing the system and adjusting the switch assemblies 140 and corresponding fluid control or sensed levels can be done simply and in the field, without any tools. In another possible system embodiment for sensing fluid level and indicating the same, fourteen microswitches 141 can be provided (not shown). Such a system could be employed to represent a series of fluid elevations on an indicator panel and have an alarm level, e.g. Of course, longer piston assemblies (rods 151 or plunger 150 or both) and switch track assemblies 130 (via longer switch track rods 136) could be substituted, thereby allowing for more room for microswitches 141 and more range of fluid level representation and control.

Top reducer 112 is connected, such as by being solvent welded, or otherwise bonded as previously described, to a spacer 120, which can also be of affordable PVC, commercially available stock. Spacer 120 can be constructed of commercially available two inch PVC conduit, e.g. In addition, spacer 120 can be of any desired length. Connected between top reducer 112 and spacer 120 is a plunger centering bracket 122 with a circular hole 123 centered therein to keep the plunger 150 centered within spacer 120. The plunger 150 is of a slightly smaller diameter than the hole 123, such that a fluidic bearing can be created wherein the plunger 150 can ride upwardly surrounded by air instead of contacting sides of hole 123. This ensures proper switch trigger 142 actuation by the plunger 150. In addition, as the plunger moves upwardly toward microswitches 140, a volume of air is being displaced within apparatus 100 (to be described in detail infra). A vent port 124 is provided to vent this displaced air. The vent port 124 can be connected to a vent line (such as 90 in FIG. 1) to vent the displaced air external to an enclosed fluid-holding vessel, e.g., and to serve as a source of fresh air when the plunger goes down in response to a decrease in fluid level (again, described more fully infra). In addition, the volume of displaced air as plunger 150 moves upwardly can only be vented at a certain rate. Therefore, plunger 150 is somewhat dampened from extremely sudden and potentially damaging, forceful upward movement by the venting air through vent port 124.

Figure 5:
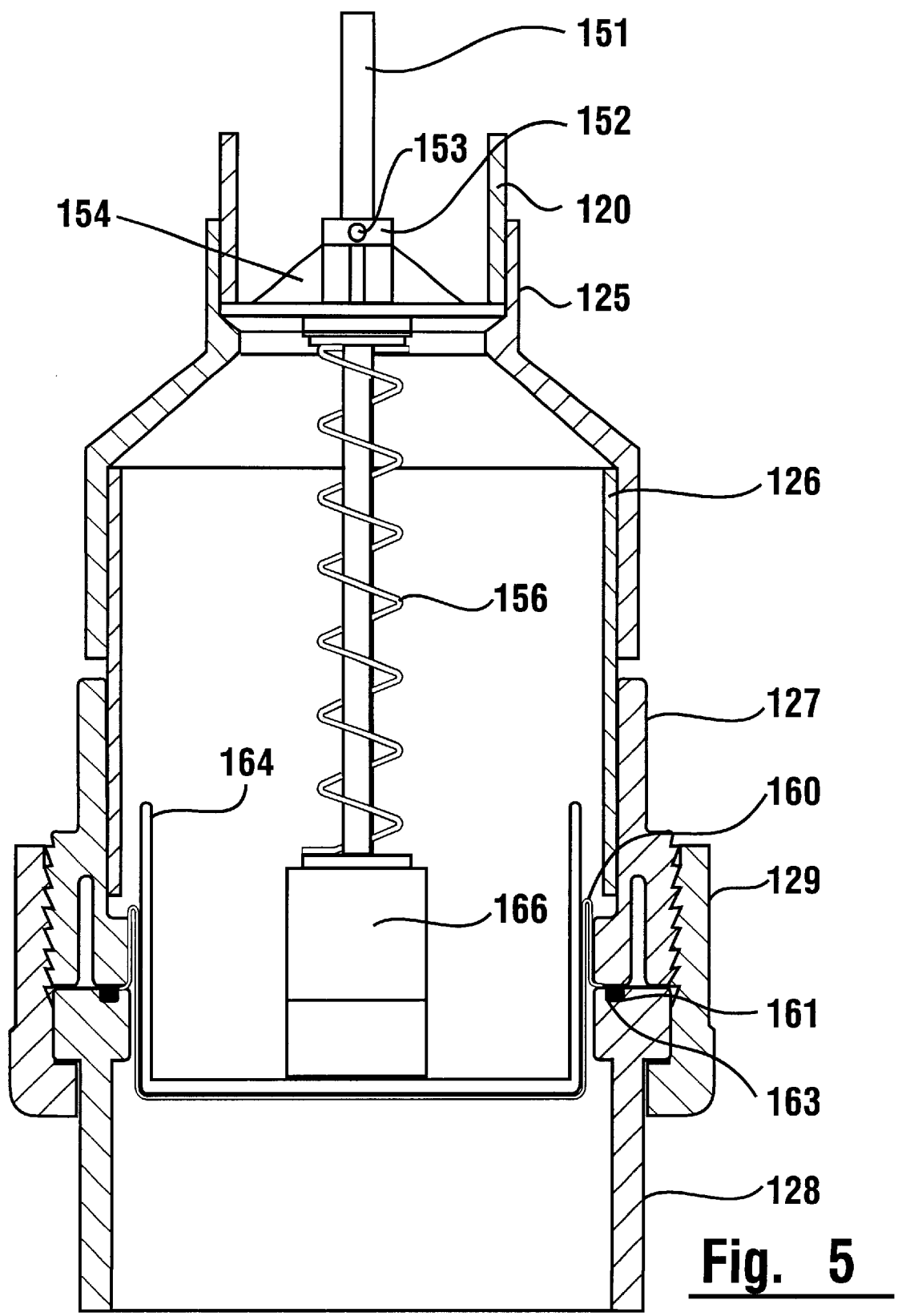
FIG. 5 is an enlarged view of the lower portion of the apparatus as encircled in the FIG. 3 depiction.
Figure 7:
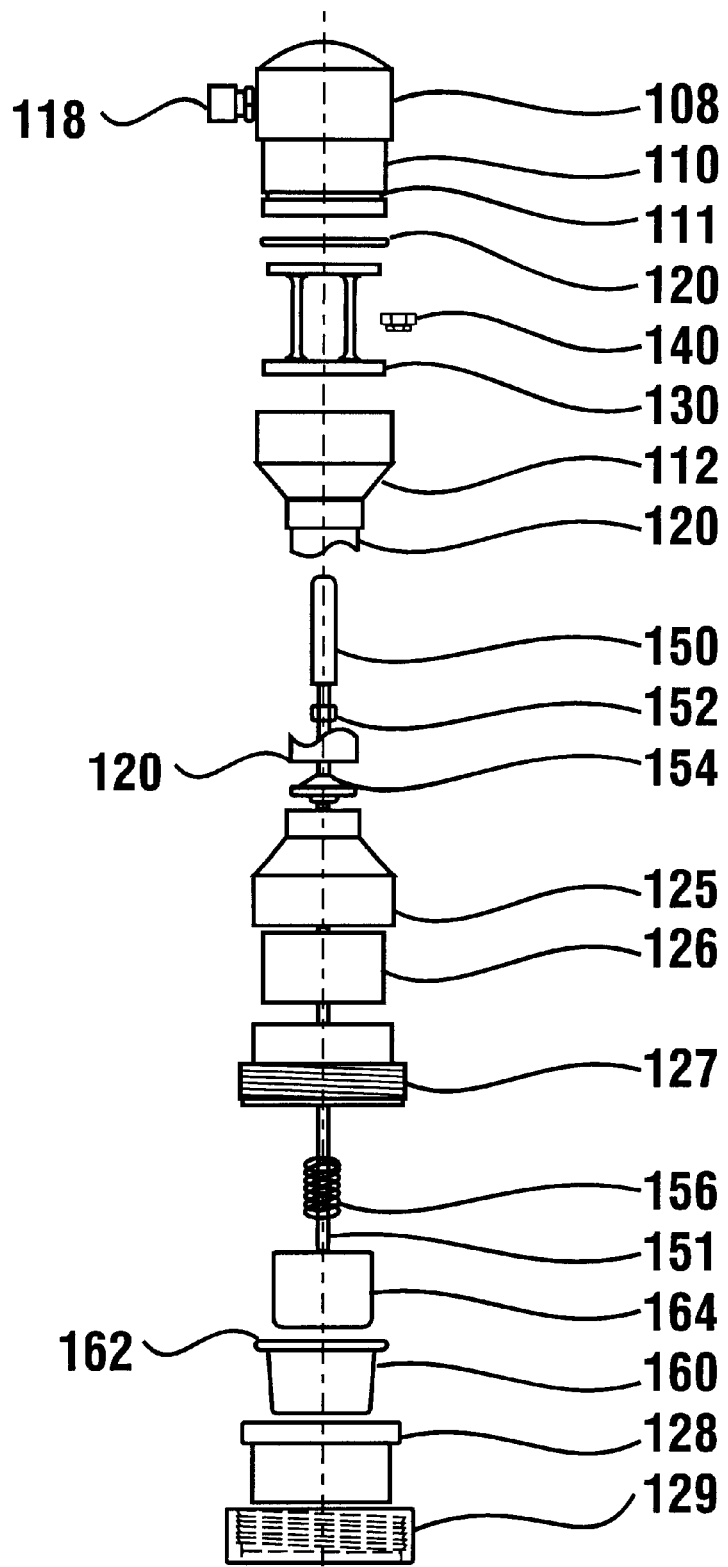
FIG. 7 is an exploded side view of an embodiment of the apparatus of the present invention.

Referring now to FIGS. 5 and 7 of the illustrated embodiment, lower unit 106 includes the sensing portion of apparatus 100 and has a housing that includes a bottom reducer 125, a bottom coupler 126, an upper and a lower seal plate, 127 and 128, respectively, and a union nut 129. Each part can be made of commercially available PVC components to save costs. Spacer 120 is connected to lower unit 106 at bottom reducer 125, such as by a solvent weld, or other manner of attachment as described supra for connecting spacer 120 and top reducer 112, e.g. Similarly, bottom reducer 125 is connected to bottom coupler 126 via a solvent welded connection or via other suitable means of attachment. Bottom coupler 126 is similarly connected to upper seal plate 127 via a solvent welded connection, or via other suitable means.

Apparatus 100 of the illustrated embodiment has a first resilient member in the form of a bellofram 160, which is a highly pliable rolling diaphragm of elastomeric material, such as nitrile butadiene, acrylinitrile, Viton® (Dupont Dow Elastomers L.L.C.), or any other suitable elastomeric material, and is selectable based on the expected environment of operation. That is, the specific elastomeric material chosen for the bellofram 160 can be based on the thermal and chemical environments, e.g., to which it is expected to be exposed to in service. Bellofram 160 is in the shape of a top hat and has a peripheral, outwardly extending flange 162 at its open end. Upper and lower seal plates 127 and 128 are connected together via a threaded connection between union nut 129 with upper seal plate 127. Flange 162 and an O-ring 161 in groove 163 of lower seal plate 128 are clamped between upper and lower seal plates 127 and 128, thereby providing a fluid tight seal and preventing fluid intrusion to the interior of the connection. Bellofram 160 can be accessed via the threaded connection between union nut 129 and upper seal plate 127 for ease of serviceability, however, bellofram 160 is extremely durable and should last for the life of the system. For example, a nitrile version of bellofram 160 is estimated to last for one million cycles, or more. However, should it tear from a sharp object or otherwise need servicing, apparatus 100 can be removed from service and union nut 129 can simply be unscrewed to get access to and replace bellofram 160 with a new one.

Apparatus 100 is sealed from the fluid on its interior and only outer surfaces of bellofram 160, lower unit 106, and a portion of spacer 120 are ever exposed to the fluid (see FIG. 1, e.g.). The pressure activated control apparatus 100 of the present invention has at least a portion of its lower unit 106 and all of the exposed outer surface of bellofram 160 submerged in the fluid. As such, pressure activated control 100 works on average pressure of the fluid on the exposed bellofram 160 and is unaffected by surface turbulence and the greasy layer of surface material often found in sewage tanks, e.g.

A push cup 164, such as of molded ABS or Lexan® (General Electric Company) plastic construction, is connected to a rod connector spacer 166. Rod connector spacer 166 is connected to a rod 151, which rod 151 is connected at a distal end to plunger 150. Rod 151 can be made of commercially available aluminum bar stock, such as from one-quarter inch bar, and cut to desired length. Together, rolling diaphragm, or bellofram, 160, push cup 164, rod connector spacer 166, rod 151 and plunger 150 function as a piston with negligible friction that is responsive to the fluid pressure against the bellofram 160, such that plunger 150 may trigger switches 141 (FIG. 6) on an upstroke resulting from increased fluid level. Bellofram 160 simply rolls and unrolls freely.

In the illustrated embodiment of the inventive pressure control apparatus 100, a second resilient member, in the form of a spring 156, provides a constant biasing force in a direction opposite the force exerted on the exposed outer surface area of the bellofram 160 that is exposed to the fluid pressure. That force exerted by the fluid pressure on the exposed area of the bellofram 160 is translated to the push cup 164 to move the plunger 150 (FIG. 4) upward against the biasing force of the spring 156. Spring 156 acts against a retained member, such as an annular spring plate 154, to provide the biasing force against the push cup 164. Spring plate 154 has a centrally located through-hole (not shown) for the rod 151 to freely slide through. A volume of air is displaced from within bellofram 160 during upward movement of rod 151 and plunger 150 that goes through this hole in the spring plate. Rapid upward movement of rod 151 and plunger 150 is dampened by the rate at which air can vent through this hole in spring plate 154 and out vent port 124 (FIG. 2). Spring plate 154 maybe formed of molded ABS or Lexan® (General Electric Company) plastic construction, as well, and is connected between spacer 120 and bottom reducer 125.

The spring 156 may be chosen with any spring constant, k, as desired to give the desired range of fluid levels to be sensed. For example, in one embodiment of apparatus 100 with a first spring 156, four inches of total plunger travel to activate switches 141 (FIG. 4) equates to about eighteen inches of fluid range that can be sensed. In another embodiment with a stiffer spring 156 (different spring constant, k), approximately forty-two inches of fluid can be sensed in the same four inches of plunger 150 travel. Of course, those ranges are based on one switch 141 being connected at the bottom of two adjacent switch track rods 136 while another switch 141 is connected near the top larger diameter portions, or rungs, 138 of two switch track rods 136. Furthermore, further ranges of sensed fluid levels for indicating or controlling fluid levels, e.g., could be established with apparatus 100 by simple replacement of spring 156 with a spring having a different "k" value. Pressure control apparatus 100 is adjustable and adaptable to a user's specific needs. It can be used to sense fluid pressure and indicate or control fluid levels on a ratio of greater than one-to-one of fluid level to switch elevation, overcoming the limit of available float style switches.

In addition, since switches 141 are adjustable anywhere along switch track rods 136, any number of desired intermediate levels of fluid level between eighteen and forty-two inches, for the two spring examples, can be sensed and controlled by simple switch 141 re-positioning along the switch tracks 136. Switch track assembly 130 has twenty-one different switch positions possible with up to fourteen total switch assemblies 140 that can be mounted thereon.

Rolling diaphragm, or bellofram 160, preferably never completely unrolls to, or is stretched beyond, its relaxed position, or rolls completely upward. In accordance with the illustrated embodiment in FIGS. 3 and 5, pressure control apparatus 100 includes a rod collar 152 attached to rod 151, such as by a clamping screw 153 that limits the downward stroke of the push cup 164 and bellofram 160 to prevent the bellofram from completely unrolling and from being stretched. Similarly, the upward limit of plunger 120 is limited by the top 132 (FIG. 4) of switch track assembly 130, such that bellofram 160 is prevented from being stretched. In an embodiment of the pressure control apparatus 100, over forty cubic inches of air from inside the rolled bellofram 160 during a sensed increase in fluid pressure is displaced and must be vented through vent port 124 (FIG. 2) with or without a corresponding vent line 90 (FIG. 1).

The invention has been described herein with reference to the preferred embodiments. Obviously, modifications and alterations will occur to others upon a reading and understanding of this specification. It is intended to include all such modifications and alterations insofar as they come within the scope of the appended claims or the equivalents thereof.

I claim:

1. A fluid level system, comprising:
   a vessel adapted to hold a fluid therein; and
   a fluid pressure sensing and switching apparatus, the apparatus including a first member having an area normally exposed to the fluid and responsive to a fluid pressure wherein each such fluid pressure corresponds to a certain fluid level, a second member providing a force against the first member in an opposite direction from the force exerted by the pressure of the fluid on the exposed area of the first member, the first member normally disposed at a first, lower elevation within the vessel and connected proximate a first end of the apparatus, one or more switches, said one or more switches disposed within the apparatus at a second end and normally disposed at a second, higher elevation within the vessel above the fluid level within the vessel, and a force translation and switch actuation member adapted to actuate the one or more switches in response to a predetermined fluid level within the vessel such that, for every incremental distance change in position of the force translation and switch actuation member between a first and second position, a greater incremental distance change in fluid elevation within the vessel is being represented corresponding to a first and second fluid level within the vessel.

2. The system of claim 1 being a fluid level indicating system wherein there are a plurality of switches, each said switch representing a different fluid level elevation within the vessel.

3. The system of claim 2 further comprising an indicator panel having a plurality of visual indications, each indication responsive to one of said switches, each indication representing a different one of said fluid level elevations within the vessel.

4. The system of claim 2 further comprising an alarm, wherein the alarm is responsive to one of said switches which represents a predetermined fluid level within the vessel.

5. The system of claim 1 being a fluid level control system wherein there are a plurality of said switches, said system further comprising a pump, the pump for selectively discharging the fluid from within the vessel.

6. The system of claim 5 further comprising a discharge line connected to the pump at a first discharge line end, the discharge line having a second end located external to the vessel.

7. The system of claim 5 further comprising a control system for selectively cycling the pump on to discharge fluid from within the vessel and off to terminate the discharging of fluid from within the vessel, the control system responsive to said plurality of switches.

8. The system of claim 1 wherein the fluid pressure sensing and switching apparatus is a self-contained unit enclosed within a housing.

9. The system of claim 8, wherein the first member comprises a first resilient member, wherein the first resilient member is connected to the housing and the housing has an interior that is sealed from contact with the fluid.

10. The system of claim 8 wherein the housing includes a head portion for containing the one or more switches.

11. The system of claim 10 wherein the head portion includes a vent, the vent connected via a hose to a location outside the vessel.

12. The system of claim 1 wherein the first member is a diaphragm and wherein the second member is a spring.

13. The system of claim 1 wherein the first member is a resilient rolling diaphragm.

14. The system of claim 3
 wherein the first member has an outer surface area normally exposed to a fluid and responsive to fluid pressure, and
 wherein the second member is adapted to provide a biasing force against an inner surface of the first member and in an opposite direction from the force exerted by the pressure of the fluid on the outer surface area of the first member.

15. The system of claim 1 wherein the first member comprises a first resilient member, and wherein the second member comprises a second resilient member.

16. A pressure activated control assembly, comprising:
 a first member having an area normally exposed to a fluid and responsive to fluid pressure wherein each such fluid pressure corresponds to a certain fluid level, the first member disposed at a first, lower location of the assembly;
 a second member providing a force against the first member in an opposite direction from the force exerted by the pressure of the fluid on the exposed area of the first member;
 one or more switches, said one or more switches disposed within the assembly at a second higher location of the assembly relative to the first member; and
 a force translation and switch actuation member adapted to actuate the one or more switches in response to one or more corresponding desired fluid levels, such that, for every incremental distance change in position of the force translation and switch actuation member between a first and second position, a greater incremental distance change in fluid elevation within the vessel is being represented corresponding to a first and second fluid level.

17. The assembly of claim 16 further comprising a switch track assembly and wherein there are a plurality of said switches disposed at different locations along the switch track assembly, each said switch for representing a different fluid level.

18. The assembly of claim 17 wherein the switch track assembly comprises a plurality of switch track rods and wherein each said switch is removably connected to a pair of said switch track rods.

19. The assembly of claim 18 wherein each said switch is snappingly connected to an adjacent pair of said switch track rods.

20. The assembly of claim 16 wherein the force translation and switch actuation member comprises a plunger.

21. The assembly of claim 16 further comprising a housing, wherein the first member is connected at a first housing end, and said one or more switches are disposed within a housing head at a second housing end that is normally disposed above a fluid surface level, said assembly being a self-contained unit having a housing interior sealed from the fluid.

22. The assembly of claim 16 wherein the first member is a rolling diaphragm and wherein the second member is a spring.

23. The assembly of claim 16
 wherein the first member has an outer surface area normally exposed to a fluid and responsive to fluid pressure, and
 wherein the second member is adapted to provide a biasing force against an inner surface of the first member and in an opposite direction from the force exerted by the pressure of the fluid on the outer surface area of the first member.

24. The assembly of claim 16 wherein the first member comprises a first resilient member, and wherein the second member comprises a second resilient member.

* * * * *